(12) United States Patent
Bennis

(10) Patent No.: US 8,096,493 B2
(45) Date of Patent: Jan. 17, 2012

(54) BAIL RELEASE MECHANISM FOR SPINNING REELS

(76) Inventor: Gary L. Bennis, Eau Claire, WI (US)

( * ) Notice: Subject to any disclaimer, the term of this patent is extended or adjusted under 35 U.S.C. 154(b) by 0 days.

(21) Appl. No.: 12/099,417

(22) Filed: Apr. 8, 2008

(65) Prior Publication Data

US 2009/0250540 A1 Oct. 8, 2009

(51) Int. Cl.
*A01K 89/01* (2006.01)
(52) U.S. Cl. ........... 242/231; 242/232; 242/233
(58) Field of Classification Search ........... 242/230, 242/231, 232, 233
See application file for complete search history.

(56) References Cited

U.S. PATENT DOCUMENTS

| | | | | |
|---|---|---|---|---|
| 3,670,984 A | * | 6/1972 | Lemery | 242/231 |
| 3,797,774 A | * | 3/1974 | Dumbauld | 242/232 |
| 3,987,976 A | * | 10/1976 | Lilland | 242/232 |
| 4,095,756 A | | 6/1978 | Morishita | |
| 4,189,108 A | * | 2/1980 | Puryear | 242/232 |
| 4,792,106 A | * | 12/1988 | Hlava | 242/233 |
| 4,874,144 A | * | 10/1989 | Murakami | 242/235 |
| 4,884,761 A | | 12/1989 | Kuntze | |
| 5,149,006 A | | 9/1992 | Hitomi | |
| 5,261,627 A | * | 11/1993 | Shinohara | 242/231 |
| 5,673,867 A | * | 10/1997 | Takeuchi | 242/231 |
| 5,839,681 A | * | 11/1998 | Kaneko | 242/231 |
| 5,848,757 A | * | 12/1998 | Amano et al. | 242/231 |
| 5,868,331 A | * | 2/1999 | Shinohara et al. | 242/231 |
| 5,911,378 A | | 6/1999 | Plestan | |
| 5,988,546 A | | 11/1999 | Young | |
| 6,056,221 A | | 5/2000 | Stiner | |
| 6,220,537 B1 | * | 4/2001 | Amano et al. | 242/231 |
| 6,257,513 B1 | | 7/2001 | Cockerham et al. | |
| 6,318,654 B1 | * | 11/2001 | Amano et al. | 242/231 |
| 6,905,086 B2 | * | 6/2005 | Sugawara et al. | 242/231 |
| 7,077,349 B2 | * | 7/2006 | Sugawara | 242/231 |
| 7,083,133 B2 | * | 8/2006 | Sugawara | 242/231 |
| 7,222,809 B1 | | 5/2007 | Neufeld et al. | |
| 2006/0163401 A1 | * | 7/2006 | Song | 242/231 |

OTHER PUBLICATIONS

Modern Language Association (MLA): "plunger." Dictionary.com Unabridged. Random House, Inc. Oct. 13, 2009. <Dictionary.com http://dictionary.reference.com/browse/plunger>.*

* cited by examiner

*Primary Examiner* — Emmanual M Marcelo
(74) *Attorney, Agent, or Firm* — McNeely, Hare & War LLP; William D. Hare

(57) ABSTRACT

A bail assembly for a spinning-type fishing reel is disclosed that includes a first bail arm, a second bail arm, a bail wire disposed between the first bail arm and the second bail arm, and a readily releasable attachment device disposed on the first bail arm to readily releasably attach the first bail arm to the reel.

27 Claims, 6 Drawing Sheets

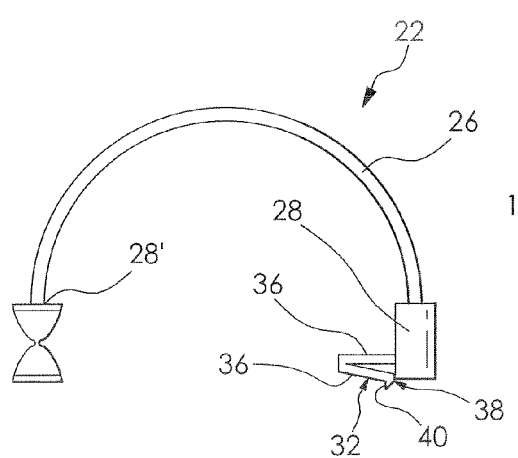
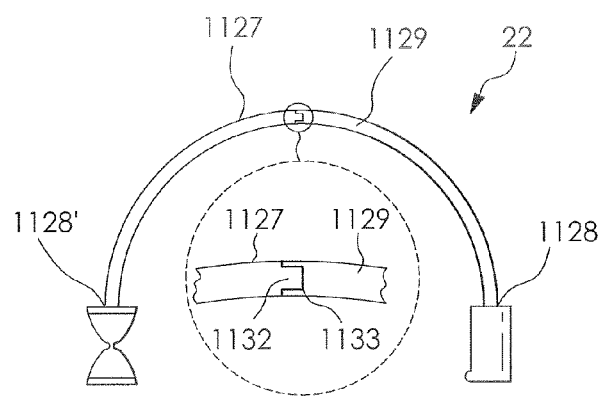
FIG. 3          FIG. 11
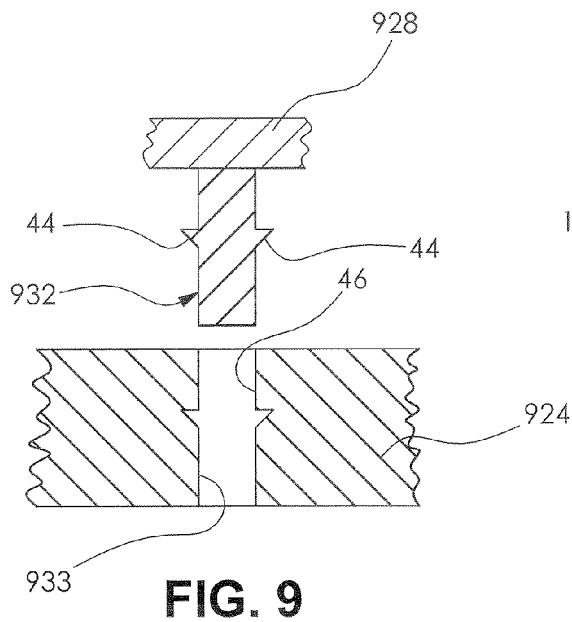
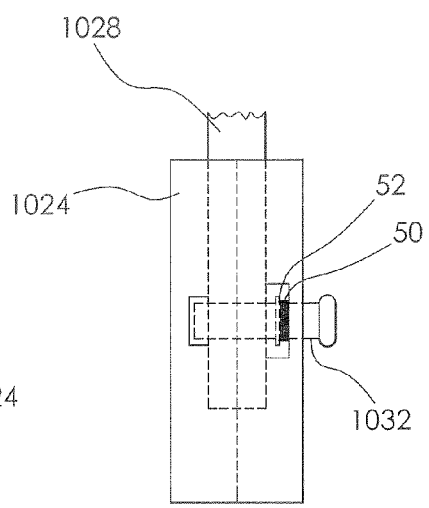
FIG. 9          FIG. 10

BAIL RELEASE MECHANISM FOR SPINNING REELS

FIELD OF THE INVENTION

The present invention relates to spinning-type fishing reels and, more particularly, to an improved bail assembly for a spinning-type fishing reel.

BACKGROUND OF THE INVENTION

Spinning-type fishing reels are well known in the art. A spinning reel typically includes a housing; an oscillating spool at an end of the housing; a rotatable crank handle extending from the housing; a rotor which rotates about the spool by cooperative movement with the crank handle; and a bail assembly. The bail assembly is typically mounted on the rotor, and operates to guide the fishing line onto the oscillating spool a turning of the crank handle. The rotor may include a pair of elongate rotor mounts which are positioned on opposite sides of the spool, to which the bail assembly is mounted.

The bail assembly of a spinning reel typically includes a U-shaped bail wire having each end fixedly connected to one of a pair of opposing bail arms. The bail arms are pivotally connected to the rotor mounts so that the bail wire and the bail arms can be pivoted between an open position to facilitate casting by feeding fishing line from the spool, and a closed position to facilitate reeling the fishing line on to the oscillating spool as a user turns the crank handle. In the open position, the bail wire is rotated to an angle substantially parallel to a longitudinal axis of the spool. In the closed position, the bail wire is rotated to a position substantially perpendicular to the longitudinal axis of the spool.

To facilitate the wrapping of the fishing line onto the oscillating spool, the bail assembly typically includes a line guide roller which receives and guides the fishing line onto the spool during the reeling operation. The line guide roller may be disposed between the bail wire and one of the bail arms. Alternatively, the line guide roller may be formed in one of the bail arms. The bail wire may be attached to the bail assembly adjacent the line roller, wherein the bail wire initially projects laterally outwardly from the line roller. Examples of prior art bail assemblies are disclosed in U.S. Pat. Nos. 6,257,513 and 6,056,221, each of which is incorporated herein by reference in its entirety.

When transferring fishing line from a spool of bulk fishing line to the spool of the fishing reel, the user ties an end of the fishing line on the spool of the reel. The user threads the fishing line from the bulk spool through eyelets on a fishing rod to the spool of the reel. Often the user will inadvertently forget to place the line under the bail wire. To remedy this, the user must cut the fishing line from the bulk spool and start the process over. To avoid starting over, the user may disassemble the reel by removing screws or pins to remove the bail wire or a bail arm, properly position the fishing line under the bail wire, and reassemble the reel. However, this requires additional time and special tools.

Similarly, when the user is fishing, the fishing line may break. When this occurs, the user must feed the fishing line from the spool on the reel, under the bail wire, through the eyelets on the fishing rod, and re-tie a lure on the end of the fishing line. Often, the user inadvertently forgets to place the line under the bail wire. The lure must then be removed from the fishing line, the fishing line must be pulled back through the eyelets, and then the fishing line must be properly positioned under the bail wire. This process is very time consuming, and may be particularly difficult when preformed in a boat where wind may be blowing, waves may be rocking the boat, lighting conditions may be poor, and the like.

Even when the user has the fishing line correctly installed under the bail on the reel and is attempting to feed line from the spool on the reel, the user must open the bail wire and thread the fishing line through the eyelets on the rod to attach a lure thereto. During this process, the bail may be bumped and caused to close. The user must then reconfigure the bail to the open position, or the fishing line will not feed properly from the spool on the reel due to the drag setting of the reel. To address this scenario, the user may set the spool so that fishing line is fed from the spool when the reel is spun in a reverse direction. However, if the user pulls the fishing line from the spool quickly, the rotor may spin too quickly causing the fishing line to wrap around the reel, resulting in a tangling of the fishing line.

One method of resolving the incorrect feeding of line around the outside of the bail wire is to remove the spool from the reel, open the bail wire, and then re-seat the spool However, current reels include spools which are held in place by fasteners. These fasteners often include fine threads which must be unthreaded from the reel before removal of the spools. This results in an additional undesirable delay.

It is desirable to produce a spinning-type fishing reel having a releasably mounted bail to facilitate efficient removal thereof for proper threading of the fishing line in a rod and the reel.

SUMMARY OF THE INVENTION

A spinning-type fishing reel having a releasably mounted bail to facilitate efficient removal thereof for proper threading of the fishing line in a rod and the reel, has surprisingly been discovered.

In one embodiment, the spinning-type fishing reel comprises a rotor having a first rotor mount and a second rotor mount; a bail assembly attached to the rotor, the bail assembly having a first bail arm attached to the first rotor mount, a second bail arm attached to the second rotor mount, and a bail wire disposed between the first bail arm and the second bail arm; and a readily releasable attachment device disposed on the first bail arm to readily releasably attach the first bail arm to one of the first rotor mount and the second rotor mount.

In another embodiment, a bail assembly for a spinning-type fishing reel is disclosed, the bail assembly comprises a first bail arm; a second bail arm spaced from the first bail arm; a bail wire disposed between the first bail arm and the second bail arm; and a readily releasable attachment device disposed on the first bail arm adapted to readily releasably attach the first bail arm to a rotor of the spinning-type fishing reel.

In another embodiment, the bail assembly comprises a first bail arm; a second bail arm having a first portion and a second portion; a hinge connecting the first portion and the second portion of the second bail arm; a bail wire attached to the first bail arm and the second bail arm, wherein an end of the bail wire is fixed to the first portion of the second bail arm; and a readily releasable attachment device disposed on the first bail arm and adapted to readily releasably attach the first bail arm to a rotor of a spinning-type fishing reel.

BRIEF DESCRIPTION OF THE DRAWINGS

The above and other objects and advantages of the invention will become readily apparent to those skilled in the art from reading the following detailed description of the invention when considered in the light of the accompanying drawings, in which:

FIG. 3 is a front elevational view of the bail assembly of FIGS. 1 and 2;

FIG. 9 is an enlarged fragmentary cross-sectional view of a securing means in accordance with another embodiment of the invention;

FIG. 10 is an enlarged fragmentary cross-sectional view of a securing means in accordance with another embodiment of the invention; and FIG. 11 is a front elevational view of a bail assembly in accordance with another embodiment of the invention.

DETAILED DESCRIPTION OF THE PREFERRED EMBODIMENTS OF THE INVENTION

The following detailed description and appended drawings describe and illustrate various exemplary embodiments of the invention. The description and drawings serve to enable one skilled in the art to make and use the invention, and are not intended to limit the scope of the invention in any manner.

Figure 1:
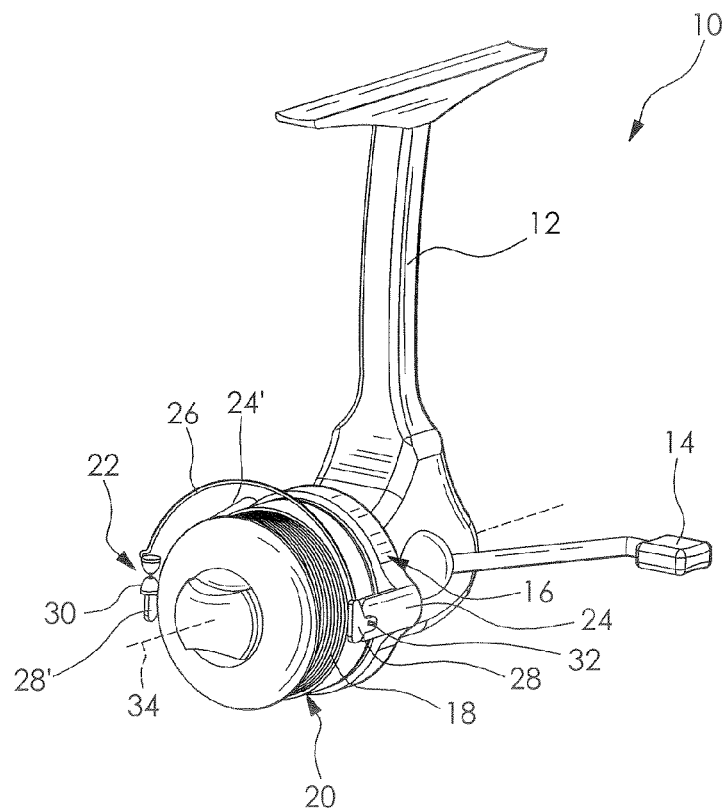
FIG. 1 is a perspective view of a spinning-type fishing reel in accordance with an embodiment of the invention and showing a bail assembly in a closed position.

FIG. 1 illustrates a spinning-type fishing reel 10 adapted to be used with a fishing rod (not shown) according to an embodiment of the invention. The reel 10 includes a mount 12 adapted to couple the reel 10 to the rod. The reel 10 also includes a rotating crank handle 14 coupled to a rotor 16 that causes a rotation of the rotor 16. The rotor 16 facilitates a winding of fishing line 18 on a spool 20. A bail assembly 22 is mounted on rotor mounts 24, 24' of the rotor 16. The rotor mounts 24, 24' are formed on opposing sides of the rotor 16 and spaced from the spool 20.

The bail assembly 22 of the reel 10 includes a substantially U-shaped bail wire 26, each end of which is connected to one of a pair of bail arms 28, 28'. The bail wire 26 and bail arms 28, 28' may be formed from a metal, a plastic, a composite material, or other conventional material, as desired. The bail arms 28, 28' are pivotally connected to the rotor mounts 24, 24', respectively. The pivotal connection facilitates a pivoting of the bail wire 26 and bail arms 28, 28' between an open position and a closed position. The open position facilitates casting by allowing the fishing line 18 to de-spool from the spool 20. The closed position facilitates reeling the fishing line 18 back onto the spool 20 as a user turns the crank handle 14.

Figure 2:
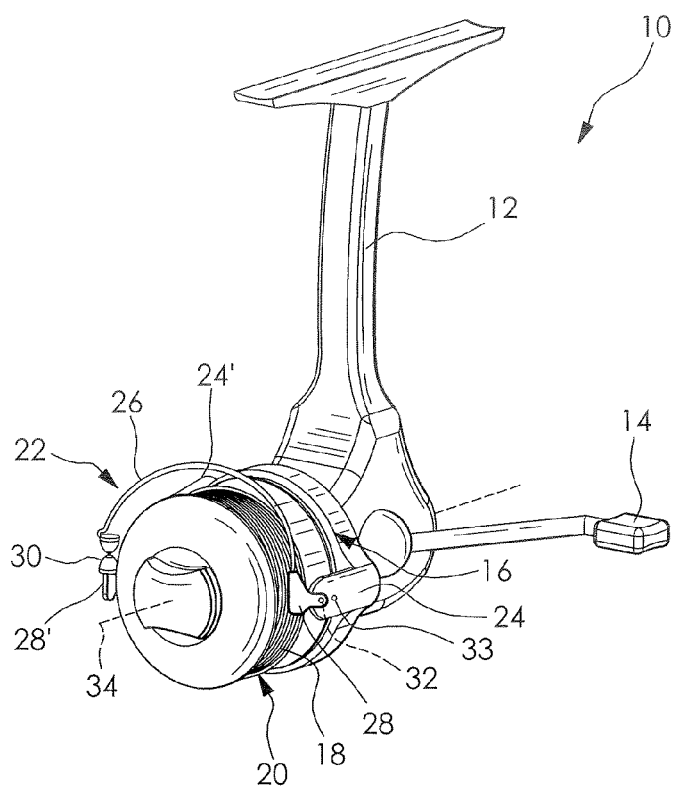
FIG. 2 is a perspective view of the fishing reel of FIG. 1 with an end of the bail assembly released from a bail arm of the reel.

The bail assembly 22 also includes a line guide roller 30 and an attachment device 32. The line guide roller 30 is disposed adjacent one end of the bail wire 26 and is adapted to guide the fishing line 18 onto the spool 20 during reeling. As shown, the line guide roller 30 is formed on the bail arm 28' adjacent the bail wire 26. As illustrated in FIGS. 1 and 2, the attachment device 32 is formed on the bail arm 28 of the bail assembly 22. It is understood that the attachment device 32 may alternatively be formed on the bail arm 28', or on both the bail arms 28, 28', as desired. The attachment device 32 is received in an aperture 33 formed in the rotor mount 24 and is adapted to readily removably attach/detach the bail assembly 22 to the rotor mount 24. As used herein, the terms "readily removably attach" and "readily removably detach" mean to substantially instantaneously attach or detach, without the assistance of a tool.

As shown in FIG. 3, the attachment device 32 is a detent extending laterally inwardly from the bail arm 28 in a direction substantially perpendicular to a longitudinal axis 34 of the spool 20. The attachment device 32 is formed from a pair of opposing detent arms 36 having a space formed therebetween. One of the arms 36 includes a flange 38 adjacent an end thereof to form a shoulder 40 thereon. The shoulder 40 is adapted to abut the rotor mount 24 adjacent the aperture 33 when the attachment device 32 is disposed in the aperture 33.

The attachment device 32 may also be formed on the bail arm 28 extending substantially parallel to the longitudinal axis 34 of the spool 20 and adapted to cooperate with an aperture formed in the rotor mount 24. It is understood that the attachment device 32 can be any attachment device adapted to readily releasably attach the bail wire 26 to one of the bail arm 28 and the rotor mount 24 such as a magnet, for example. In the embodiment shown in FIG. 3, the attachment device 32 has a substantially cylindrical shape. The attachment device 32 may have any shape as desired.

The bail arm 28' is fixed to the rotor mount 24' by a fastener such as a screw. The bail arm 28' may also have a second attachment device 32 formed thereon adapted to cooperate with an aperture formed in the rotor mount 24', similar to that described for the bail arm 28, to readily releasably attach the bail wire 26 thereto.

In use, the bail assembly 22 is attached to the rotor 16 by attaching the bail arm 28' to the rotor mount 24' with the fastener. The bail arm 28 is attached to the rotor mount 24 by inserting the attachment device 32 into the aperture 33 until the shoulder 40 of the flange 38 abuts the rotor mount 24. The shoulder 40 cooperates with the rotor mount 24 to militate against an unintended removal of the attachment device 32 from the aperture 33. If the user has inadvertently fed fishing line 18 from a bulk supply of fishing line (not shown) to the spool 20 over the bail wire 26, the bail arm 28 is readily detached from the rotor mount 24 by pressing the flange 38 of the arm 36 towards the other arm 36. The attachment device 32 and the bail arm 28 are then pulled outwardly from the rotor mount 24, thereby opening a space therebetween, through which the fishing line 18 may be inserted to properly position the fishing line 18 under the bail wire 26 and adjacent the line guide roller 30, as shown in FIG. 2. Because the bail wire 26 is typically formed from a flexible and elastic material, the bail wire 26 may be repeatedly pulled away from the bail arm 28 and returned to a position with the attachment device 32 disposed in the aperture 33, as desired. The readily removable attachment device 32 facilitates an efficient re-positioning of the fishing line 18 from outside of the bail wire 26 to under the bail wire 26, without having to cut the fishing line 18 and without the assistance of a tool.

Additionally, when the user is rigging the fishing line 18, the user may adjust the reel 10 to a closed position, position the fishing line 18 over the bail wire 26 of the bail assembly 22, rig the fishing line 18, then re-position the fishing line 18 under the bail wire 26 as described herein. By rigging the fishing line 18 over the bail assembly 22, the affect of the rotation of the rotor 16 is minimized.

Figure 3A:
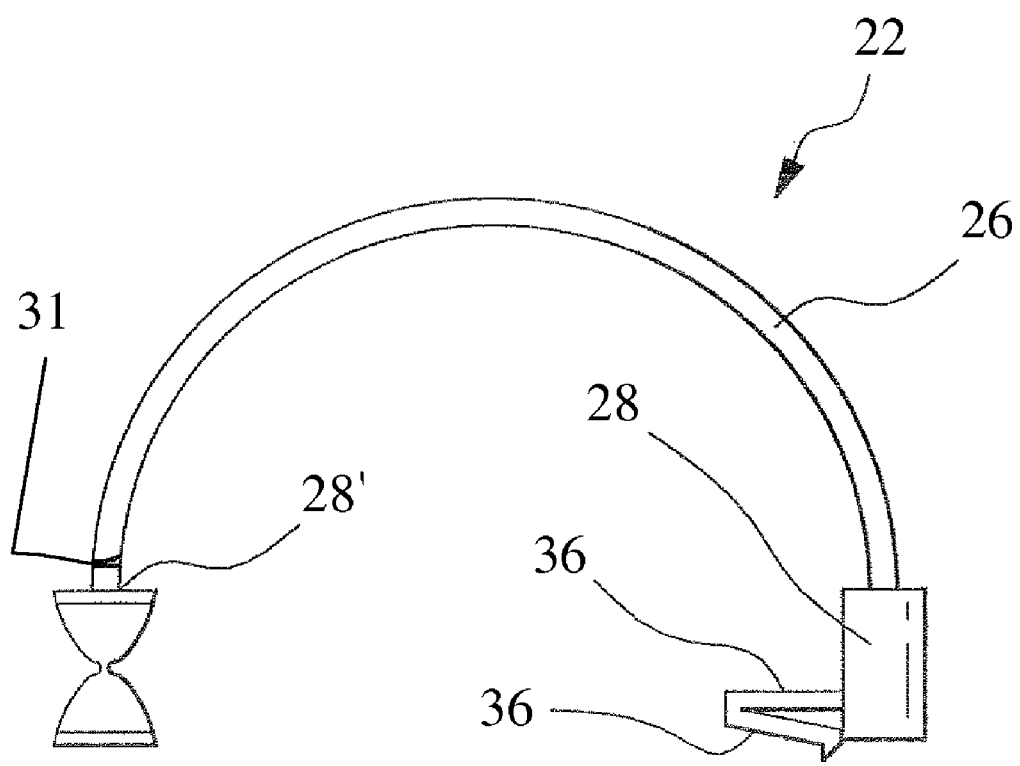
FIG. 3a is a perspective view of a spinning type fishing reel showing a hinge intermediate the line guide roller and the bail wire.

As illustrated in FIG. 3*a*, it is understood that a hinge mechanism 31 can be provided at an interface between the bail wire 26 and the line guide roller 30. Additionally a pivot limiter or stop (not shown) can be provided to militate against a pivoting of the bail wire 26 beyond a desired point. These features can be provided in combination with any of the embodiments of the invention disclosed herein without departing from the scope and spirit thereof.

Figure 4:
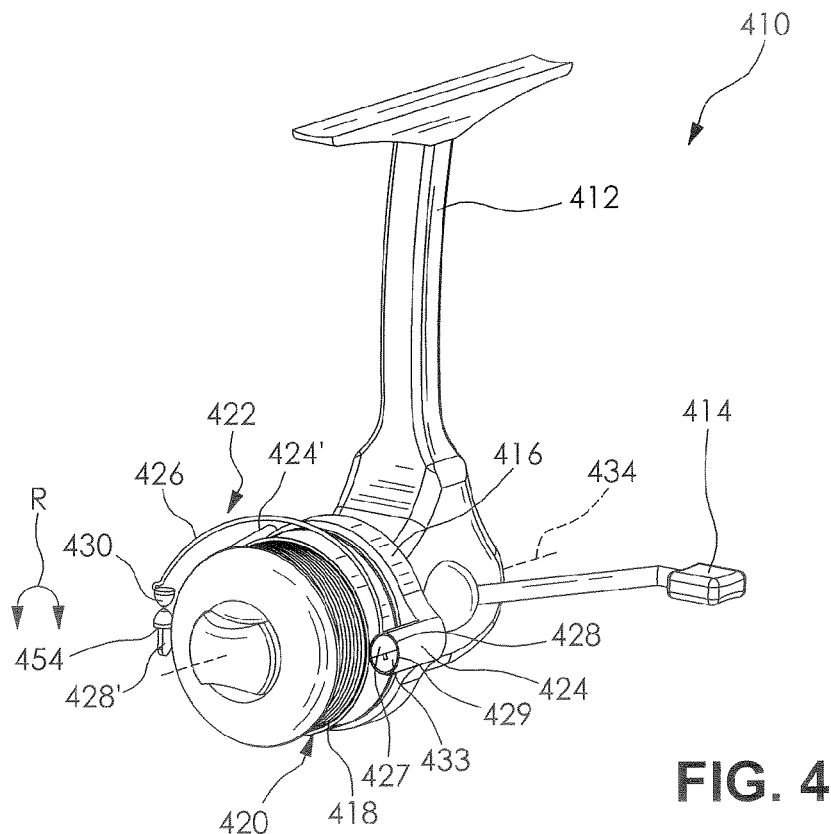
FIG. 4 is a perspective view of a spinning-type fishing reel in accordance with another embodiment of the invention.

FIG. 4 illustrates a spinning-type fishing reel 410 adapted to be used with a fishing rod (not shown) according to another embodiment of the invention. The reel 410 includes a mount 412 adapted to couple the reel 410 to the rod. The reel 410 also includes a rotating crank handle 414 that causes a rotation of a rotor 416 to selectively reel-in or release fishing line 418 from a spool 420 disposed at an end of the rotor 416. A bail assembly 422 is mounted on rotor mounts 424, 424' of the rotor 416. The rotor mounts 424, 424' are formed on opposing sides of the rotor 416 and spaced from the spool 420.

The bail assembly 422 of the reel 410 includes a substantially U-shaped bail wire 426, each end of which is connected to one of a pair of bail arms 428, 428'. The bail wire 426 and bail arms 428, 428' may be formed from a metal, a plastic, a composite material, or other conventional flexible material, as desired. The bail arms 428, 428' are pivotally connected to the rotor mounts 424, 424', respectively. The pivotal connection facilitates a pivoting of the bail wire 426 and bail arms 428, 428' between an open position and a closed position. The open position facilitates casting by allowing the fishing line 418 to de-spool from the spool 420. The closed position facilitates reeling the fishing line 418 back onto the spool 420 as a user turns the crank handle 414. The bail arm 428 includes a first portion 427 and a second portion 429. The first portion 427 is selectively fixed to the bail wire 426, and readily releasably attached to the second portion 429 by an attachment device 432. The second portion 429 is attached to the rotor mount 424. The attachment device 432 is adapted to readily removably attach the first portion 427 to the second portion 429 of the bail arm 428'. It is understood that the attachment device 432 may be formed on the bail arm 428 and readily releasably attached to the rotor mount 424, as desired.

The bail arm 428' includes a line guide roller 430. The line guide roller 430 is disposed adjacent one end of the bail wire 426 and is adapted to guide the fishing line 418 onto the spool 420 during reeling. The line guide roller 430 is formed on the bail arm 428' adjacent the bail wire 426. A hinge 454 is disposed on the bail arm 428' to facilitate a pivoting of the bail wire 426 in a direction as indicated by arrow R. The hinge 454 may be a separate hinge or a portion of the material forming the bail arm 428', as desired.

The attachment device 432 shown includes a detent and extends between the first portion 427 and the second portion 429 of the bail arm 428 in a direction substantially perpendicular to a longitudinal axis 434 of the spool 420. The attachment device 432 is received in an aperture 433 formed in the second portion 429 of the bail arm 428. In the embodiment shown in FIG. 4, the attachment device 432 has a substantially cylindrical shape. The attachment device 432 may have any shape as desired. The bail arm 428' may be fixed to the rotor mount 424' by a fastener such as a screw, for example. Alternatively, the bail arm 428' may also have an attachment device formed thereon adapted to cooperate with an aperture formed in the rotor mount 424'.

Figure 5:
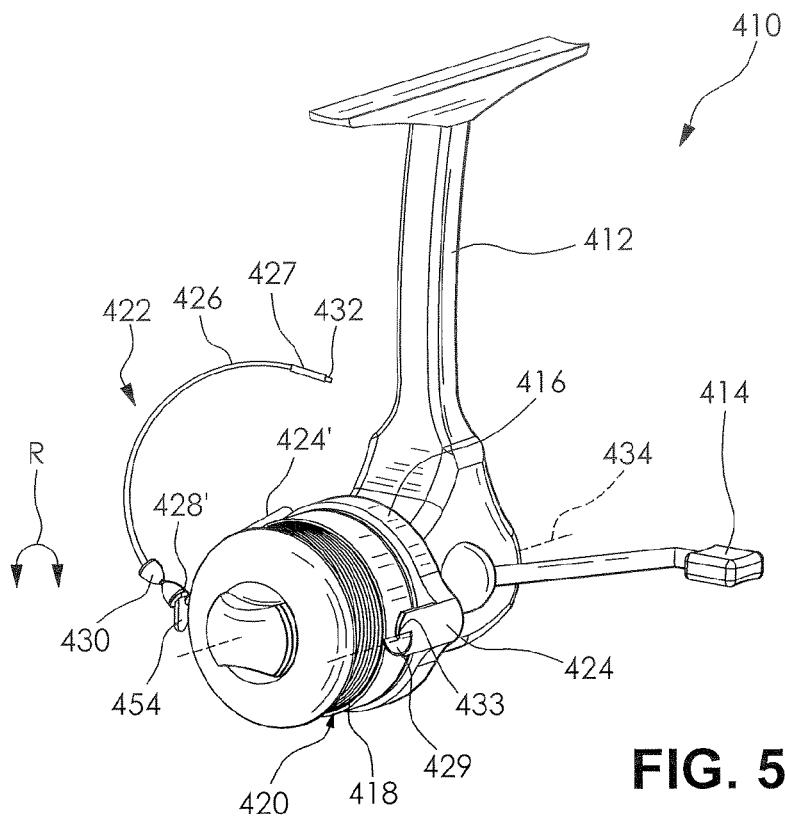
FIG. 5 is a perspective view of the spinning-type fishing reel of FIG. 4 with an end of a bail assembly released from a bail arm of the reel and rotated upwardly.

In use, the bail assembly 422 is attached to the rotor 416 by attaching the bail arms 428, 428' to the rotor mounts 424, 424', respectively, with fasteners. If the user has inadvertently fed fishing line 418 from a bulk supply of fishing line (not shown) to the spool 420 over the bail wire 426, the first portion 427 of the bail arm 428 is readily releasably detached from the second portion 429 of the bail arm 428 by pulling the portions 427, 429 apart. The bail wire 426 and the first portion 427 of the bail arm 428 are then pivoted upwardly about the hinge 454 away from the rotor mount 424, as shown in FIG. 5. Accordingly, a space is provided, through which the fishing line 418 may be inserted for proper positioning of the fishing line 418 under the bail wire 426. Because the first portion 427 of the bail arm 428 is readily removably coupled to the second portion 429 thereof and rotatable away from the bail arm rotor mount 424, the user may efficiently position the fishing line 418 under the bail wire 426 without having to cut the fishing line 418 and without the assistance of a tool. Additionally, when the user is rigging the fishing line 418, the user may adjust the reel 410 to a closed position, position the fishing line 418 over the bail wire 426 of the bail assembly 422. The user can then rig the fishing line 418 and re-position the fishing line 418 under the bail wire 426. By rigging the fishing line 418 with the fishing line 418 positioned over the bail wire 426, the affect of the rotation of the rotor 416 is minimized.

Figure 6:
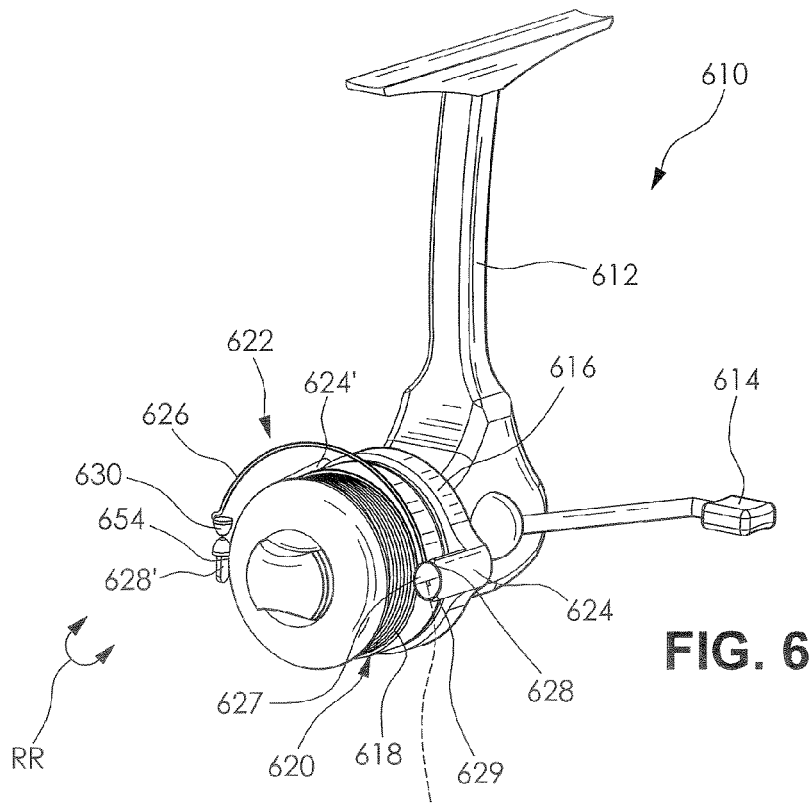
FIG. 6 is a perspective view of a spinning-type fishing reel in accordance with another embodiment of the invention.

FIG. 6 is a fishing reel 610 according to another embodiment of the invention. The embodiment of FIG. 6 is similar to the fishing reel of FIGS. 4 and 5 except as provided below. Like structure from FIGS. 4 and 5 repeated in FIG. 6 includes reference numerals in the 600s, with the last two digits the same.

A bail assembly 622 of a reel 610 includes a substantially U-shaped bail wire 626 which is connected to a pair of bail arms 628, 628'. The bail wire 626 and bail arms 628, 628' may be formed from a metal, a plastic, a composite material, or other conventional flexible material, as desired. The bail arms 628, 628' are pivotally connected to the rotor mounts 624, 624', respectively, so that the bail wire 626 and bail arms 628, 628' can be pivoted between an open position to facilitate casting, and a closed position to facilitate reeling the fishing line 618 back onto the spool 620. The bail arm 628 includes a first portion 627 and a second portion 629. The first portion 627 is fixed to the bail wire 626 and readily releasably attached to the second portion 629 by an attachment device 632. The second portion 629 is selectively fixed to the rotor mount 624. The attachment device 632 is adapted to readily removably attach the first portion 627 to the second portion 629 of the bail arm 628'.

The bail arm 628' includes a line guide roller 630. The line guide roller 630 is adapted to guide the fishing line 618 onto the spool 620 during the reeling operation. The line guide roller 630 is formed on the bail arm 628' adjacent the bail wire 626. A hinge 654 is disposed on the bail arm 628' to facilitate a pivoting of the bail wire 626 in a direction as indicated by arrow RR. The hinge 626 is disposed on the bail arm 628' adjacent the line guide 630. The hinge 654 may be a separate hinge or a portion of the material forming the bail arm 628', as desired.

As shown in FIG. 6, the attachment device 632 includes a detent and extends downwardly from the first portion 627 of the bail arm 628 in a direction substantially perpendicular to a longitudinal axis 634 of the reel 610. The attachment device 632 cooperates with an aperture 633 formed in the second portion 629 of the bail arm 628. In the embodiment shown in FIG. 6, the attachment device 632 has a substantially cylindrical shape. The attachment device 632 may have any shape, as desired. The bail arm 628' may be fixed to the rotor mount 624' by a fastener such as a screw, for example, or other attachment device. Alternatively, the other bail arm 628' may also have an attachment device formed thereon adapted to cooperate with an aperture formed in the rotor mount 624'.

Figure 7:
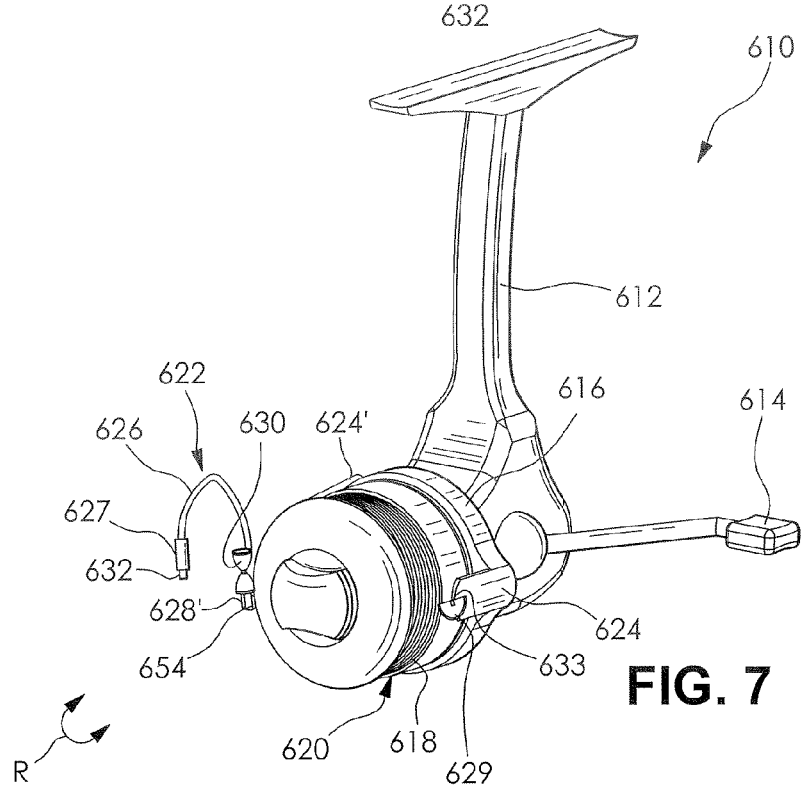
FIG. 7 is a perspective view of the spinning-type fishing reel of FIG. 6 with an end of the bail assembly released from a bail arm of the reel and rotated outwardly.

In use, the bail assembly 622 is attached to the rotor 616 by attaching the bail arms 628, 628' to the rotor mounts 624, 624', respectively. If the user has inadvertently fed fishing line 618 from a bulk supply of fishing line (not shown) to the spool 620 over the bail wire 626, the first portion 627 of the bail arm 628 is readily releasably detached from the second portion 629 of the bail arm 628 by pulling the portions 627, 629 apart. The bail wire 626 and the first portion 627 of the bail arm 628 are then pivoted outwardly about the hinge 654 in the direction RR away from the rotor mount 624, as shown in FIG. 7, thereby providing a space in which the fishing line 618 may be disposed for proper alignment with the roller guide 630. Because the first portion 627 of the bail arm 628 is readily removably attached to the second portion 629 thereof and rotatable away from the rotor mount 624, the user may efficiently replace the fishing line 618 under the bail wire 626 without having to cut the fishing line 618 and without the assistance of a tool.

Figure 8:
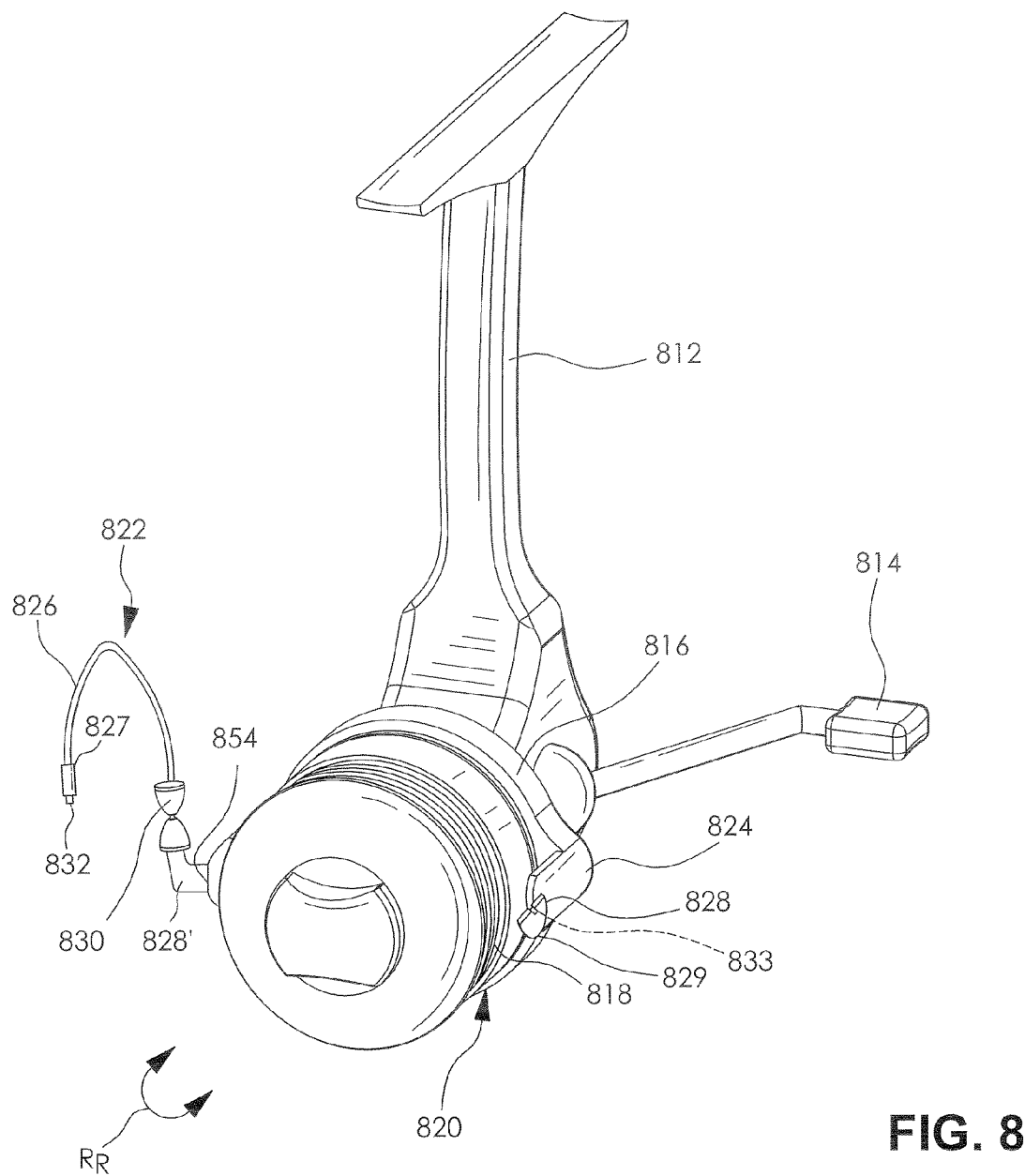
FIG. 8 is a perspective view of a spinning-type fishing reel in accordance with another embodiment of the invention.

FIG. 8 is a fishing reel 810 according to another embodiment of the invention. The embodiment of FIG. 8 is similar to the fishing reel of FIGS. 6 and 7 except as provided below. Like structure from FIGS. 6 and 7 repeated in FIG. 8 includes reference numerals in the 800s, with the remaining two digits the same.

A bail assembly 822 of a reel 810 includes a substantially U-shaped bail wire 826 which is connected to a pair of bail arms 828, 828'. The bail wire 826 and bail arms 828, 828' may be formed from a metal, a plastic, a composite material, or other conventional flexible material, as desired. The bail arms 828, 828' are pivotally connected to the rotor mounts 824, 824', respectively, so that the bail wire 826 and bail arms 828, 828' can be pivoted between an open position to facilitate casting by feeding the fishing line 818 from the spool 820, and a closed position to facilitate reeling the fishing line 818 back onto the spool 820. The bail arm 828 includes a first portion 827 and a second portion 829. The first portion 827 is selectively fixed to the bail wire 826 and readily releasably attached to the second portion 829 by an attachment device 832, while the second portion 829 is selectively fixed to the rotor mount 824. The attachment device 832 is adapted to readily removably attach the first portion 827 to the second portion 829 of the bail arm 828'.

The bail arm 828' includes a line guide roller 830. The line guide roller 830 is adapted to guide the fishing line 818 onto the spool 820 during the reeling operation. The line guide roller 830 is formed on the bail arm 828' adjacent the bail wire 826. A hinge 854 is disposed on the bail arm 828' to facilitate a pivoting of the bail wire 826 in a direction as indicated by arrow RR. The hinge 826 is disposed intermediate the line guide 830 and the rotor mount 824'. In the embodiment shown in FIG. 8, the hinge 854 is pivotally connects the bail arm 828' to the rotor mount 824'. The hinge 854 may be a separate hinge or a portion of the material forming the bail arm 828', as desired.

As shown in FIG. 8, the attachment device 832 includes a detent and extends downwardly from the first portion 827 of the bail arm 828 in a direction substantially perpendicular to a longitudinal axis 834 of the reel 810. The attachment device 832 cooperates with an aperture formed in the second portion 829 of the bail arm 828. In the embodiment shown in FIG. 8, the attachment device 832 has a substantially cylindrical shape. The attachment device 832 may have any shape, as desired. The bail arm 828' may be fixed to the rotor mount 824' by a fastener such as a screw, for example, or other attachment device, or the other bail arm 828' may also have an attachment device formed thereon adapted to cooperate with an aperture formed in the rotor mount 824'.

In use, the bail assembly 822 is attached to the rotor 816 by attaching the bail arms 828, 828' to the rotor mounts 824, 824', respectively. If the user has inadvertently fed fishing line 818 from a bulk supply of fishing line (not shown) to the spool 820 over the bail wire 826, the first portion 827 of the bail arm 828 is readily releasably detached from the second portion 829 of the bail arm 828 by pulling the portions 827, 829 apart. The bail wire 826 and the first portion 827 of the bail arm 828 are then pivoted about the hinge 854 in the direction RR away from the rotor mount 824, thereby providing a space in which the fishing line 818 may be disposed for proper alignment with the roller guide 830. Because the first portion 827 of the bail arm 828 is readily removably coupled to the second portion 829 thereof and pivotable away from the rotor mount 824, the user may efficiently replace the fishing line 818 under the bail wire 826 without having to cut the fishing line 818 and without the assistance of a tool.

FIG. 9 is an enlarged view of an attachment device 932 according to another embodiment of the invention. The attachment device 932 is formed on a bail arm 928 of a reel similar to the reel 10 of FIG. 1. The embodiment of FIG. 9 is similar to the attachment device 32 of FIGS. 2-4 except as described below. Like structure from FIGS. 2-4 repeated in FIG. 9 includes reference numerals in the 900s, with the remaining two digits the same.

As shown, the attachment device 932 includes detents and extends laterally inwardly from the bail arm 928 in a direction substantially perpendicular to a longitudinal axis of the reel. The attachment device 932 cooperates with an aperture 933 formed in a side of a rotor mount 924. It is understood that the attaching 932 may be formed on the bail arm 928 extending substantially parallel to the longitudinal axis, as desired. In the embodiments shown in FIG. 9, the attachment device 932 has a substantially cylindrical shape, but the attachment device 932 may have any shape. The attachment device 932 includes a plurality of detents 44 extending radially outwardly therefrom. The detents 44 may be formed from any flexible material such as a polymer, for example. The detents 44 are adapted to cooperate with a groove or indentation 46 formed in the walls forming the aperture 933 formed in the rotor mount 924 to readily releasably attach the attachment device 932 to the rotor mount 924.

In use, the bail assembly is attached to a rotor by attaching a second bail arm to a second rotor mount. The bail arm 928 is then attached to the rotor mount 924 by pressing the attachment device 932 into the aperture 933 of the rotor mount 924 until the detents 44 are disposed in the groove 46. The attachment device 932 may form a friction fit with the walls forming the aperture 933, as desired. If the user has inadvertently fed fishing line from a bulk supply of fishing line (not shown) the spool over a bail wire, the bail arm 928 is readily removably detached from the rotor mount 924. To readily detach the bail arm 928, the bail arm 928 is pulled outwardly away from the rotor mount 924. Because the detents 44 of the attachment device 932 are formed from a flexible material, the detents 44 deflect in a direction opposite of the direction from which the bail arm 928 is pulled, thereby disengaging the protuberances 44 from the groove 46.

The attachment device 932 and bail arm 928 are then pulled away from the rotor mount 924, thereby providing a space therebetween in which the fishing line may be inserted for proper alignment with a line guide roller. It is understood that the bail wire and/or second bail arm may be pivotable about an axis substantially perpendicular to the longitudinal axis of the reel to facilitate the pivoting of the bail wire away from the rotor when the bail arm 928 is detached from the rotor mount 924.

FIG. 10 shows an attachment device 1032 according to another embodiment of the invention. The attachment device 1032 is formed on a bail arm 1028 of a reel similar to the reel 10 of FIG. 1. The embodiment of FIG. 10 is similar to the attachment device 32 of FIGS. 2-4 except as described below. Like structure from FIGS. 2-4 repeated in FIG. 10 includes reference numerals in the 1000s, with the remaining two digits the same.

As shown, the attachment device 1032 is a spring biased pin adapted to readily releasably attach a two-piece rotor mount 1024 to the bail arm 1028. The attachment device 1032 includes a spring 50 and a flange 52 adapted to militate against complete removal of the attachment device 1032 from an aperture 1033 formed in the rotor mount 1024. The flange 52 is formed from a flexible material to facilitate installation of the attachment device 1032. In the embodiment shown in FIG. 10, the attachment device 1032 has a substantially cylindrical shape. The attachment device 1032 may have any shape, as desired.

In use, the spring 50 is disposed in the rotor mount 1024. The attachment device 1032 is pushed through the aperture 1033 formed in the rotor mount 1024, thereby deflecting the flange 52. Once the flange 52 has passed through the aperture 1033, the flange 52 returns to an undeflected position. The spring 50 is then disposed intermediate the flange 52 and the rotor mount 1024. The rotor mount 1024 is then assembled. In the embodiment shown, the attachment device 1032 is disposed through the aperture 1033 at an angle substantially perpendicular to the longitudinal axis of the spool. It is understood that the attachment device 1032 may be formed on the bail arm 1028 extending substantially parallel to the longitudinal axis, as desired. The attachment device 1032 is pulled outwardly away from the rotor mount 1024, and the bail arm 1028 is pushed downwardly into the aperture 1033. The attachment device 1032 is then released and is slidably positioned through the aperture 1033 formed in the bail arm 1028, thereby militating against the removal thereof from the rotor mount 1024.

If the user has inadvertently fed fishing line from the bulk supply of fishing line to a spool of the reel over a bail wire, the bail arm 1028 is readily releasably detached from the rotor mount 1024 by pulling the attachment device 1032 outwardly away from the rotor mount 1024. Once the attachment device 1032 is removed from the aperture 1033 formed in the bail arm 1028, the bail arm 1028 may be removed from the rotor mount 1024. The attachment device 1032 is then released by the user and a force caused by the spring 50 on the flange 52 draws the attachment device 1032 back into rotor mount 1024. Because the bail arm 1028 is readily removably coupled to a rotor of the reel, the user may efficiently dispose the fishing line under the bail wire without having to cut the fishing line and without the assistance of a tool.

FIG. 11 illustrates a bail assembly 1122 according to another embodiment of the invention. The bail assembly 1122 disposed on a reel similar to the reel 10 of FIG. 1. The embodiment of FIG. 11 is similar to bail assembly 1122 of FIGS. 2-4 except as described below. Like structure from FIGS. 2-4 repeated in FIG. 11 includes reference numerals in the 1100s, with the remaining two digits the same.

The bail assembly 1122 is mounted on opposing rotor mounts of a rotor of the reel. The bail assembly 1122 includes a substantially U-shaped bail wire 1126 which is connected to a pair of bail arms 1128, 1128'. The bail wire 1126 includes a first portion 1127 and a second portion 1129 readily releasably attached thereto. The bail arms 1128, 1128' are pivotally connected to the rotor mounts, respectively, so that the bail wire 1126 and bail arms 1128, 1128' can be pivoted between an open position to facilitate casting by feeding fishing line from a spool, and a closed position to facilitate reeling the fishing line back onto the spool.

The bail assembly 1122 also includes a line guide roller and an attachment device 1132. As illustrated in FIG. 11, the attachment device 1132 is formed on an end of the first portion 1127 of the bail wire 1126 and extends laterally outwardly therefrom. The attachment device 1132 is adapted to cooperate with an aperture 1133 formed in an end of the second portion 1129 of the bail wire 1126. The attachment device 1132 and the aperture 1133 may be formed anywhere on the first portion 1127 and/or the second portion 1129, as desired. In the embodiment shown, the attachment device 1132 includes a detent and has a cylindrical shape. The aperture 1133 has a shape corresponding to that of the attachment device 1132. The attachment device 1132 may be a magnet adapted to readily releasably attach the first portion 1127 to a metal portion of the second portion 1129. It is understood that the attachment device 1132 may include a protuberance or tab adapted to cooperate with a groove or indentation in the walls forming the aperture 1133, as desired. It is also understood that the attachment device 1132 may include a button or other spring biased mechanism for readily removably attaching and detaching the portions 1127, 1129.

In use, the bail assembly 1122 is attached to the rotor by attaching the bail arms 1128, 1128' to the rotor mounts. The first portion 1127 of the bail wire 1126 is readily releasably attached to the second portion 1129 thereof by positioning the attachment device 1132 in the aperture 1133. The attachment device 1132 forms a friction fit with the walls of the second portion 1129 forming the aperture 1133, thereby militating against the removal thereof. If the user has inadvertently fed fishing line from a bulk supply of fishing line to the spool over the bail wire 1126, the first portion 1127 of the bail wire 1126 is readily detached from the second portion 1129 thereof to provide a space therebetween in which the fishing line may be disposed for proper alignment. It is understood that the first portion 1127 and the second portion 1129 may be pivotable about the bail arms 1128', 1128, respectively, to provide a larger space therebetween, as desired. Because the bail wire 1126 is readily removably coupled to the rotor, the user may efficiently replace the fishing line under the bail wire 1126 without having to cut the fishing line and without the assistance of a tool.

From the foregoing description, one ordinarily skilled in the art can easily ascertain the essential characteristics of this invention and, without departing from the spirit and scope thereof, can make various changes and modifications to the invention to adapt it to various usages and conditions in accordance with the scope of the appended claims.

What is claimed is:
1. A spinning-type reel comprising:
  a rotor having a first rotor mount and a second rotor mount;
  a bail assembly attached to said rotor, said bail assembly having a first bail arm attached to the first rotor mount, a second bail arm attached to the second rotor mount, and a bail wire having ends fixedly disposed on the first bail arm and the second bail arm; and
  a readily releasable attachment device disposed on one of the first bail arm and the second bail arm to readily releasably attach the first bail arm to the first rotor mount or the second bail arm to the second rotor mount, wherein the first bail arm can be readily released from the first rotor mount and reattached to the first rotor mount.

2. The spinning-type reel of claim 1, wherein said attachment device cooperates with an aperture formed in the first rotor mount to readily releasably attach the first bail arm thereto.

3. The spinning type reel of claim 2, wherein the readily releasable attachment device comprises a pair of arms resiliently opposed and having a space formed there between with one arm including a flange adjacent an end thereof to form a shoulder to cooperate with the aperture in the first rotor mount.

4. The spinning-type reel of claim 1, further comprising a second readily releasable attachment device formed on the second bail arm.

5. The spinning-type reel of claim 1, wherein the second bail arm includes a first portion fixed to the bail wire and a second portion fixed to the second rotor mount.

6. The spinning-type reel of claim 5, further comprising a hinge connecting the first portion and the second portion of the second bail arm.

7. The spinning-type reel of claim 6, wherein said hinge facilitates a pivoting of the bail wire and the first portion of the second bail arm relative to the second portion of the second bail arm.

8. The spinning type reel of claim 7, wherein said hinge facilitates a pivoting of the bail wire and the first portion of the first bail arm to an angle substantially parallel or substantially perpendicular to a longitudinal axis of the spool.

9. The spinning-type reel of claim 6, further comprising a line guide roller formed on the second bail arm.

10. The spinning-type reel of claim 9, wherein said hinge is disposed intermediate said line guide roller and the second rotor mount.

11. The spinning-type reel of claim 9, wherein said hinge is disposed intermediate said line guide roller and the bail wire.

12. The spinning type reel of claim 1, wherein the readily releasable attachment device on the first bail arm when attached to the first rotor mount will not allow the fishing line to pass between the first bail arm and the first rotor mount and when released from the rotor mount will allow the fishing line to pass between the first bail arm and the first rotor mount.

13. The spinning type reel of claim 1, wherein at least one of the first and second bail arm is mounted in a generally perpendicular direction to the longitudinal axis of the first rotor mount.

14. The spinning-type reel of claim 1, wherein the first and second rotor mounts extend from the reel in a direction generally parallel to the longitudinal axis of a spool mounted to the reel.

15. The spinning-type reel of claim 1, wherein the bail wire has a main portion and two end portions at opposite ends of the main portion, the main portion and the two end portions having a generally consistent radius over the length of the bail wire.

16. The spinning-type reel of claim 1, further comprising a pivot point to permit the bail assembly to pivot about an axis parallel to the longitudinal axis of a spool shaft of the reel.

17. The spinning-type reel of claim 1, wherein the readily releasable attachment device permits removal of the first bail arm from the first rotor mount without a bending stress being placed on the bail wire.

18. A bail assembly for a spinning-type fishing reel comprising:
    a first bail arm;
    a second bail arm spaced from said first bail arm;
    a bail wire having ends fixedly disposed on said first bail arm and said second bail arm; and
    a readily releasable attachment device disposed on the first bail arm adapted to readily releasably attach the first bail arm to a rotor of the spinning-type fishing reel, wherein the first bail arm can be readily released from the rotor and reattached to the rotor.

19. The bail assembly of claim 18, further comprising a second readily releasable attachment device formed on said second bail arm.

20. The bail assembly of claim 18, wherein the second bail arm includes a first portion fixed to the bail wire and a second portion adapted to be fixed to the rotor.

21. The bail assembly of claim 20, further including a hinge connecting the first portion and the second portion of the second bail arm.

22. The bail assembly of claim 21, further comprising a line guide roller formed on said second bail arm.

23. The bail assembly of claim 18, further comprising a line guide formed on the second bail arm and wherein a hinge is formed intermediate said line guide and said bail wire.

24. The bail assembly of claim 18, wherein said attachment device is adapted to cooperate with an aperture formed in the rotor to readily releasably attach said second bail arm thereto.

25. A bail assembly for a spinning-type fishing reel comprising:
    a first bail arm;
    a second bail arm having a first portion and a second portion;
    a hinge connecting the first portion and the second portion of said second bail arm;
    a bail wire attached to said first bail arm and said second bail arm, wherein an end of said bail wire is fixed to the first portion of said second bail arm; and
    a readily releasable attachment device disposed on said first bail arm and adapted to readily releasably attach said first bail arm to a rotor of a spinning-type fishing reel, wherein the first bail arm can be readily released from the rotor and reattached to the rotor.

26. The bail assembly of claim 25, further comprising a second readily releasable attachment device formed on said second bail arm.

27. The bail assembly of claim 25, further comprising a line guide roller formed on said second bail arm, wherein said hinge is formed intermediate said line guide and said bail wire.

* * * * *